United States Patent

[11] 3,611,956

| [72] | Inventors | Samuel Moore<br>Antrim, Ireland;<br>Frank E. Jones, Shropshire, England |
|---|---|---|
| [21] | Appl. No. | 841,806 |
| [22] | Filed | July 15, 1969 |
| [45] | Patented | Oct. 12, 1971 |
| [73] | Assignee | said Moore, by said Jones |
| [32] | Priority | July 20, 1968 |
| [33] | | Great Britain |
| [31] | | 34,711/68 |

[54] MEANS FOR AGRICULTURAL SEEDING
5 Claims, 9 Drawing Figs.

[52] U.S. Cl............................................ 111/62,
111/87, 172/462, 172/678
[51] Int. Cl............................................ A01c 5/06,
A01c 7/08, A01h 63/00
[50] Field of Search............................... 111/85, 87,
64, 62; 172/462, 678

[56] References Cited
UNITED STATES PATENTS

| 678,248 | 7/1901 | Hoyt.............................. | 111/87 X |
| 1,170,696 | 2/1916 | Squier........................... | 111/87 |
| 2,754,622 | 7/1956 | Rohnert......................... | 111/85 X |
| 2,981,213 | 4/1961 | O'Neil........................... | 111/85 X |
| 3,115,853 | 12/1963 | Gellner.......................... | 111/85 X |
| 3,177,830 | 4/1965 | Zimmerman................. | 111/85 |
| 3,228,363 | 1/1966 | Gardner et al................ | 111/85 X |
| 3,335,681 | 8/1967 | Main et al...................... | 111/64 |

Primary Examiner—Robert E. Pulfrey
Assistant Examiner—Stephen C. Pellegrino
Attorney—Scrivener Parker Scrivener and Clarke ABSTRACT: In agricultural sowing of seeds, seeds are delivered through tubes to slits cut in the ground by a plurality of discs. At least one roller is adapted to compact the ground and close the slits after seeds have been implanted in the slits. The discs and the rollers are carried by arm assemblies mounted on a frame connected to a drawbar and a resilient connection is adjustable to effect relative movement between the frame and the drawbar in a vertical plane to vary the loading applied to the discs.

3,611,956

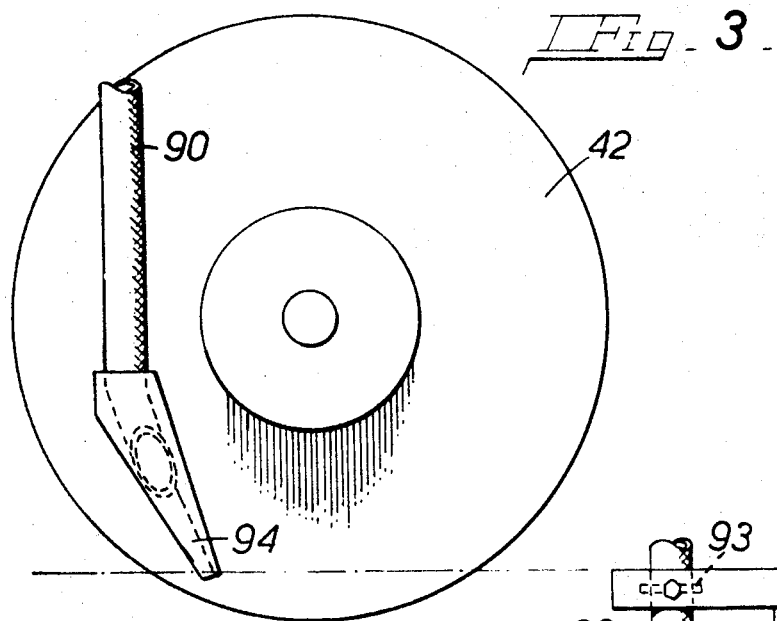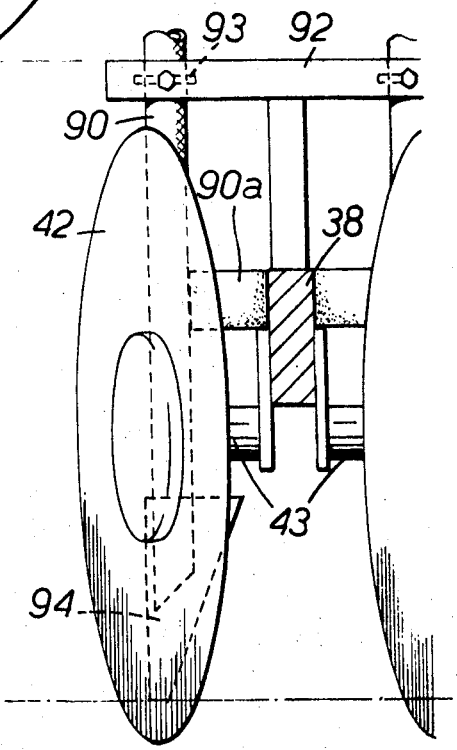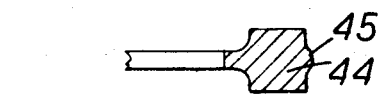

PATENTED OCT 12 1971 3,611,956
SHEET 4 OF 4
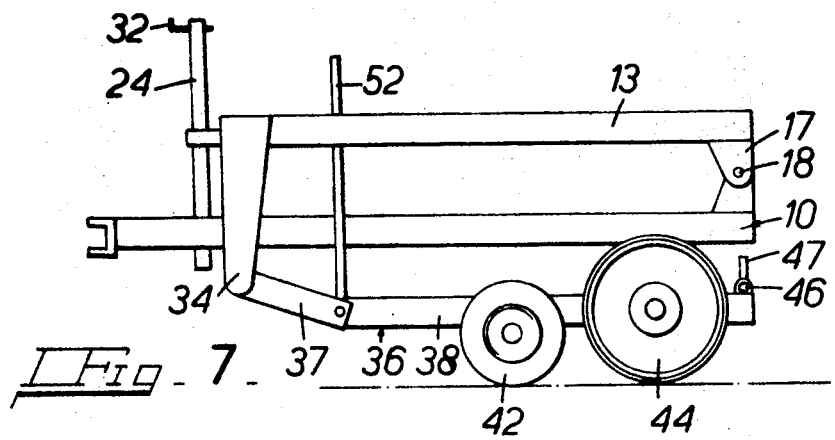
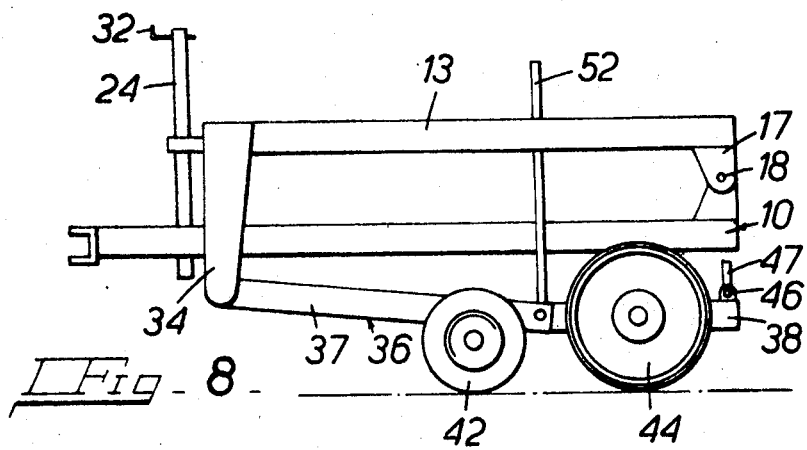
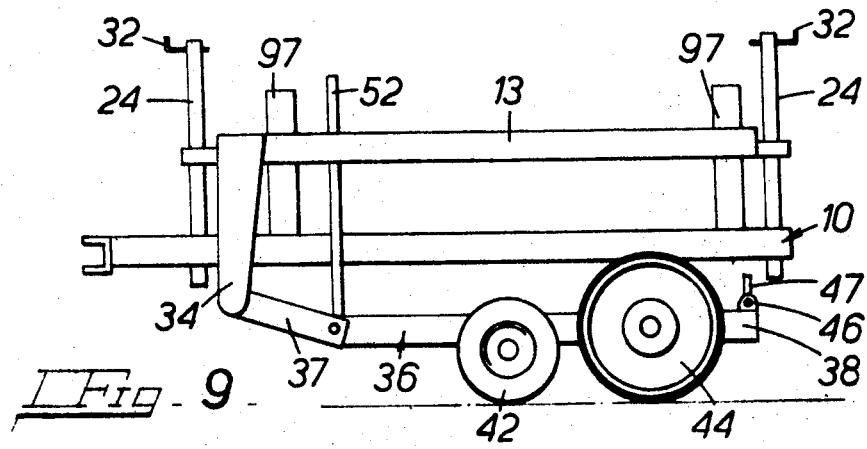

MEANS FOR AGRICULTURAL SEEDING

This invention relates to agricultural sowing of seeds by the technique of slit sowing in which seeds are implanted in slits or narrow slots cut in the ground, not necessarily cultivated or otherwise prepared except, in suitable cases, where vegetation is killed by the application of suitable chemicals. More particularly our invention is concerned with apparatus for preparing and seeding ground in which seeds from a seedbox mounted on a frame assembly for connection to a towing vehicle are delivered through tubes to slits which are cut and opened in the ground by a plurality of discs mounted on the frame assembly for rotation about generally transverse axes, at least one roller mounted on the frame assembly in a position rearwardly of the discs for rotation about a transverse axis is adapted to compact the ground and close the slits after seeds have been implanted therein.

Hitherto known apparatus of the kind set forth have not been satisfactory in operation over different ground conditions. For example, under light ground conditions a slit is readily cut but excessive penetration has to be avoided. Conversely, it is difficult to obtain adequate penetration in heavier ground. Furthermore, the operative parts of the apparatus have to be arranged to follow closely the contours of the ground. There is also a tendency for vegetation to spring back over a cut slit before the seed is deposited and if the lower delivery end of the seed tube is too close to the slit the tube tends to become blocked by vegetation. Sufficiently close sowing of rows of seeds also presents a further problem.

According to our invention in apparatus of the kind set forth the frame assembly comprises first and second frames which are relatively movable in a vertical plane of which the first frame comprises a drawbar for connection to a towing vehicle and the second forms a mounting for a plurality of spaced substantially parallel longitudinally extending arm assemblies carrying the discs, the arm assemblies being located below the frames and being urged downwardly away from the second frame by resilient means, and a resilient connection is provided between the second frame and the drawbar by adjustment of which the loading on the apparatus applied to the discs can be varied to control penetration of the disc into the ground and the depth of the slits thus produced.

Preferably the seedbox is carried by the second frame and the frames are pivotally connected at their rear ends for relative movement about a transverse horizontal axis.

Each arm assembly may comprise a pair of arms which are pivotally connected at adjacent ends, and at least the forward end of each arm assembly is pivotally connected to the second frame. Alternatively each arm assembly may comprise a rigid arm.

The resilient means preferably comprise a pair of resiliently loaded struts which act respectively between ends of the arms of each arm assembly, and between the second frame and the rearmost ends of each arm assembly.

Each arm assembly preferably carries a pair of discs and a pair of ground-compacting rollers, and the discs on adjacent arm assemblies may be staggered longitudinally whereby the discs on alternate assemblies are aligned transversely. This has the advantage that the apparatus can accommodate a maximum number of discs within the width of the second frame, and the adjacent discs are spaced from each other in close proximity compatible with a desired spacing of the slits and rows of seeds.

The axis of rotation of each disc is inclined away from a normal to the arm assembly by which it is carried in such a direction that the forward or leading edge of the disc is directed towards the arm assembly at a small angle and the portion of the disc where it penetrates the ground is inclined at a small angle towards a vertical plane passing through the arm assembly so that the slit cut by the discs is widest at its upper end due to the ground-displacing action of the disc. The discharge end of each seed tube for delivering seeds to each slit is mounted adjacent to each disc at a point rearwardly of the axis of rotation of the disc above the lowest point on the peripheral edge of the disc and the discharge end of each seed tube terminates above the widest uppermost end of each slit cut by the disc adjacent to which that seed tube is mounted.

Preferably a skim is urged resiliently against each disc and extends in advance of the discharge end of the seed tube mounted adjacent to that disc, at least as far as the slit. The skim has a front surface extending upwardly and outwardly away from the direction of movement of the apparatus so as to deflect vegetation from above the slit and permit seed from the seed tubes to fall into the slits.

One embodiment of our invention and some modifications are illustrated in the accompanying drawings in which:

FIG. 3 is a side elevation of a ground-cutting disc incorporated in the apparatus of FIGS. 1 and 2 showing a portion of the seed tube and a skim associated with that tube;

FIG. 4 is a front elevation of the assembly shown in FIG. 3 including a portion of an adjacent disc;

FIG. 5 is a diagrammatic plan view showing the relationships between a pair of cutting discs, seed tubes and skims;

FIG. 6 is a section through a part of a ground-engaging roller;

FIG. 7 is a diagrammatic side elevation of the apparatus illustrated in FIGS. 1 and 2;

FIG. 8 is a diagrammatic side elevation similar to FIG. 7 but showing a modification; and FIG. 9 is a diagrammatic side elevation similar to FIG. 7 but showing a further modification.

Figure 1:
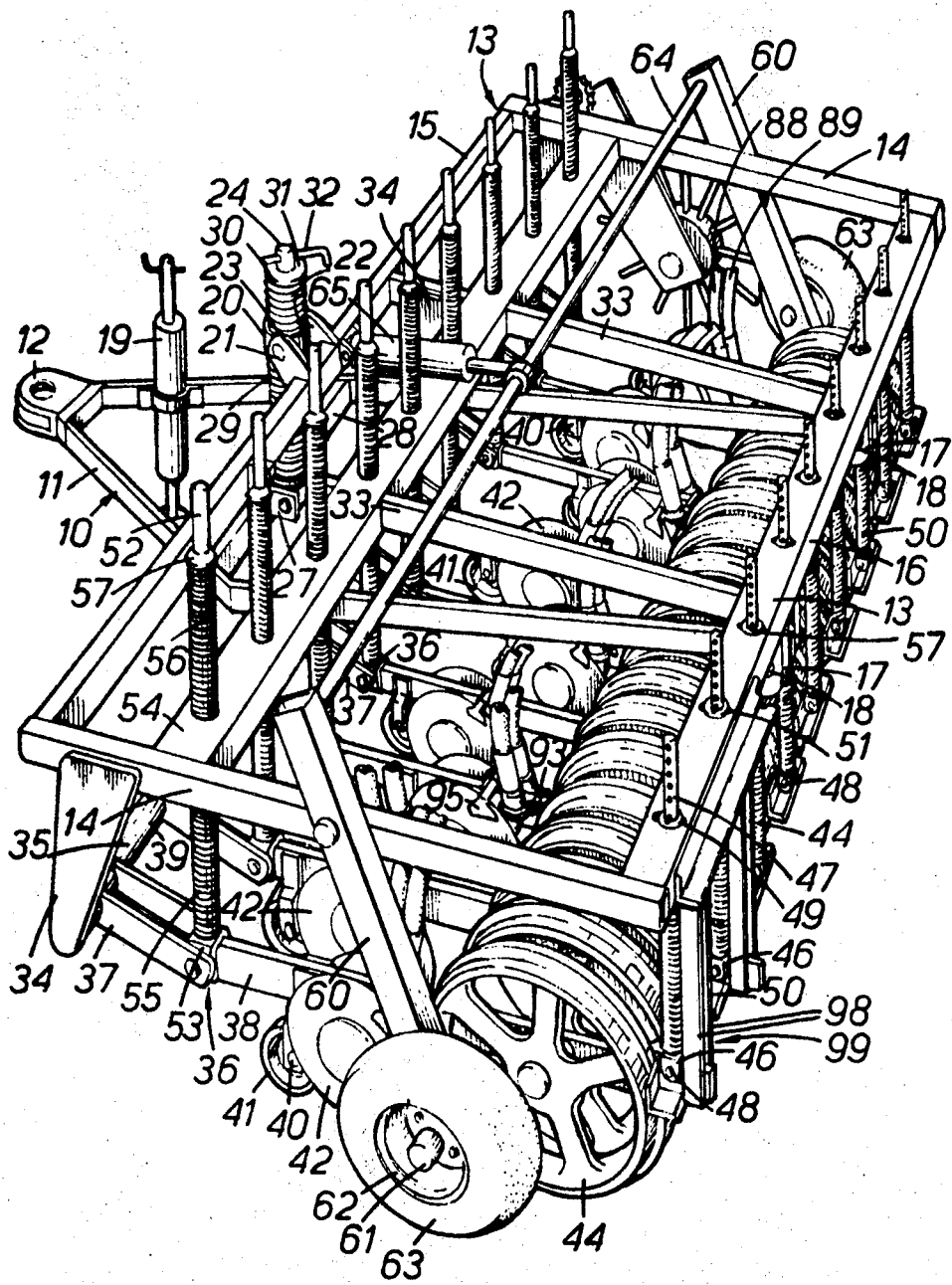
FIG. 1 is a perspective view of apparatus for preparing and seeding ground with a seedbox and fertilizer box omitted for clarity.

In the apparatus illustrated in FIGS. 1 to 7 of the accompanying drawings, 10 is a first frame in the form of a forked drawbar 11 of substantially wishbone outline, provided at its forward end with a towing bracket 12. The drawbar 11 is located below a generally rectangular second frame 13 which is oblong in a transverse direction and which comprises spaced parallel side members 14, secured at opposite ends between opposite ends of spaced parallel front and rear members 15, 16. A pair of spaced brackets 17 extending downwardly from the rear member 16 are connected by pivot pins 18 to the free rear ends of limbs of the drawbar 11.

An adjustable ground-engaging screwjack 19 extending vertically downwards from one limb of the drawbar 11 provides a support for the apparatus when it is uncoupled from a towing tractor.

A trunnion block 20 is pivotally mounted between spaced lugs 21 of a forwardly facing bracket 22 secured to the front member 15 at the midpoint in its length. The trunnion block 20 is provided with a central opening 23 through which slides a vertical rod 24. The rod 24 is in screw-threaded engagement at its lower end in a trunnion block 26 pivotally mounted between spaced lugs 27 secured to a transverse bracing member 28 connecting the limbs of the drawbar 11. Compression springs 29 and 30 surrounding the rod 24 act between the trunnion blocks 20 and 26, and between the trunnion block 20 and an abutment plate 31 adjacent to the upper end of the rod 24. Rotation of the rod 24, by means of a handle 32 at its upper end, alters the effective length of the rod between trunnion blocks 20 and 26 which causes relative angular movement of the frames 10, 12 to take place about the pivotal connections 18.

The frame 12 includes a pair of spaced longitudinally extending members 33 which are secured at opposite ends between the front and rear members 15 and 16 in positions between the limbs of the drawbar 11. A bracket 34 extends downwardly from each longitudinal bracing member 33, and from each side member 14 at positions adjacent to the front member 15 of the frame 12. The brackets are aligned transversely and a transverse shaft 35 is journaled in aligned openings adjacent to their lowermost ends.

A plurality of spaced arm assemblies 36, each comprising a pair of arms 37, 38 pivotally connected at adjacent ends, are journaled at their forward ends on the shaft 35. Adjacent arm assemblies 36 are spaced from each other by distance pieces 39 carried by the shaft 35.

Each arm 38 carries a yoke 40 between spaced limbs on which is rotatably mounted a depth control roller 41. The yoke 40 is mounted on the arm 38 by a removable bolt engageable in any one of a series of vertically spaced holes in the yoke and a single complementary hole in the arm 38 (not shown) so that the vertical position of the roller 41 may be adjusted.

At a position rearwardly of the depth control roller 41 each arm 38 provides a mounting for a pair of cutting discs 42. Each pair of cutting discs 42 are rotatably mounted on opposite sides of the arm 38 on stub axles 43 which are inclined in opposite directions such that the forward or leading edge of each disc 42 is inclined towards the arm 38, and the portion of the disc where it penetrates the ground is directed towards a vertical plane passing through the arm 38. Suitable angles of inclination of the discs 42 are between 4° and 6°, and between 1° and 3° respectively. Alternative pairs of discs 42 are staggered in a longitudinal direction to enable a closer spacing to be obtained between the slits according to the width of the frame 13, and each roller 41 is mounted just in front of the disc with which it is associated to assist a close following of the ground contour.

A pair of ground-compacting rollers 44 are rotatably mounted on opposite sides of each arm 38 in a position rearwardly of the cutting discs 42 mounted on that arm to pass over and close the slit cut in the ground by a corresponding disc. Each roller is formed with a central peripheral rib 45 (FIG. 6) to facilitate closure of the slit. The maximum penetration of the discs 42 into the ground is determined by the vertical position of the rollers 41.

A bifurcated end fitting 46 secured to a rod 47 is pivotally connected by a pin 48 to the rear end of each arm 38. The rod 47 extends upwardly through longitudinal slots 49 in the upper and lower surfaces of the rear member 16 of the frame 13, which is of box section. The slots 49 are elongated in the normal direction of travel of the apparatus so as to accommodate oscillation of the limbs. A spring 50 surrounding the rod 47 acts between the fitting 46 and the underside of the rear member 16, and the upper end of rod 47 is provided with a number of openings through one of which a pin 57 is inserted above a washer to limit the downward movement of the rear end of the arm 38 away from the frame 13.

A rod 52 secured to a bifurcated fitting 53 which is connected to the pivotal connection between adjacent ends of each pair of arms 37 and 38 passes upwardly through openings in upper and lower surfaces of a transverse crossmember 54 secured at opposite ends between the side members 14 of the frame 13. Compression springs 55, 56 are arranged on the rod 52 between fitting 53 and the crossmember 54, and between crossmember 54 and an abutment plate 57 fixed on the rod 52 adjacent to its upper end. The axial positions of the abutment plates 57 may be adjusted to alter the effective loading of the springs 55 and 56.

A pair of arms 60 are pivotally connected at intermediate points in their lengths to aligned points between opposite ends of the side members 14 of the frame 13. Each arm 60 carries at its lower end a stub axle 61 upon which a road wheel 62 provided with a pneumatic tire 63 is rotatably mounted. Upper ends of the arms 60 are connected by a transverse tie bar 64 and an hydraulic jack 65 acts between the tie bar 64 and the front member 15 of the frame 13. The jack 65 is connected to the hydraulic system of a tractor and an extension or contraction of the hydraulic jack causes the wheels 62 to be lowered or raised in an arc.

A seedbox 70 of known construction (FIG. 2) is mounted on brackets 71 on the frame 13, and a fertilizer box 72 of known construction is mounted on further brackets 73 in a position rearwardly of the seedbox. A spider wheel 74 is rotatably carried by an arm 75 pivoted to a side member 14 of the frame 13 adjacent to its forward end. A rod 76 is pivotally connected at its lower end to the arm 75 and its upper end passes through a bracket 77 on the bracket 71. A spring 78 encircling the rod 76 acts between the arm 75 and bracket 77 to urge the spider wheel 75 resiliently into contact with the ground. Downward movement of the arm 75 is limited by the engagement of a pin 79 passing through an opening in the upper end of the rod 76, with the side member 14.

A chain sprocket (not shown) is drivingly connected to the spider wheel 74 in alignment with one of a pair of sprockets 81 which are rotatably carried on the side members 14 at the point at which the arm 75 is connected to the member. A drive chain 82 is connected between the sprocket driven by the spider wheel 74 and one of the aligned sprockets 81. A further chain 83 carries the drive from the second of the sprockets 81 to a reduction gearbox 84 mounted on the seedbox 70 from whence the drive is taken by a further chain 85 to a sprocket 86 which is drivingly connected to a pocketed roller-type seed-metering device of known construction. A drive is taken to a similar fertilizer-metering device by a sprocket connected to sprocket 86 and a chain 87. Seed is delivered from the metering device through flexible, preferably noncorrugated tubes 88, 89, to rigid seed tubes 90, of which one tube 90 is located adjacent to each disc 42. Fertilizer is delivered through chutes 91 to the ground behind the machine.

A T-shaped bracket 92 (FIG. 4) is secured to the upper side of each arm 38 and a seed tube 90 is connected to the end of each crosspiece of the bracket 92 by an eye bolt 93. A skim 94 is attached to the lower or discharge end of each seed tube, for example by welding. Each skim 94 has a flat surface which is pressed against the face of the adjacent disc by resilient means, for example, a rubber block 90a engaging between the arm 38 and the seed tube 90. The lower end of the skim 94 extends as far as the ground when the disc 42 is in its working position with its lower edge penetrating the ground as shown in FIGS. 3 and 4 where the ground line is indicated in broken lines. The skim is narrow at its lower end and widens towards its upper end which slops away from the direction of travel of the apparatus in both the vertical and horizontal planes so that the lower end of the skim can engage and deflect vegetation overlying the slit so that a clear slit is provided into which the seed can be deposited from the seed tube 90. The skim is loaded against the disc to prevent vegetation passing between skim and disc which might gain access to the seed tube opening and blocking it. The skim 94 also serves to clean one side of each disc and a further scraper 95 resiliently carried by the T-bracket is provided to clean the other side of the disc (FIG. 1) scrapers 96 are also provided for the rollers 44 and depth control rollers 41.

In a modification of the construction of apparatus described above, the inclinations of the disc 42 may be reversed. However, where there is any appreciable amount of vegetation this does have the disadvantage that vegetation tends to be funnelled and compressed between a pair of discs with the risk that they may become clogged and prevented from rotating. This does not occur when the discs are inclined in the manner which has been described above and any tendency for such funnelling to occur between discs on adjacent limbs is obviated by the staggering of the discs which has been described.

In the modification illustrated in FIG. 8 the ground-cutting discs 42 are carried by the arms 37 whilst the rollers 44 are carried by the arms 38. In the modification illustrated in FIG. 9, the drawbar 10 includes vertical guides 96 and the frame 13 is provided with rollers or articulated bearing blocks which are slidable in the guides 96. The adjusting mechanism comprising the rod 24 and the parts associated with it is duplicated at the rear of the apparatus. In this construction the discs 42 and rollers 44 are illustrated as being carried by the arm 38 but it is to be understood that they may be mounted as illustrated in FIG. 8.

The rods 47 with the springs 50 may be omitted when no fertilizer box is provided. Their omission prevents transference of weight on to the rollers and under light soil conditions, or when the machine is heavily laden, for example when carrying fertilizer in addition to seed, the rollers may tend to lift off the ground.

The arm assemblies 36 may be of one piece, preferably cranked or bent upwards, towards their front ends so as to give adequate ground clearance in the vicinity of the brackets 34.

Figure 2:
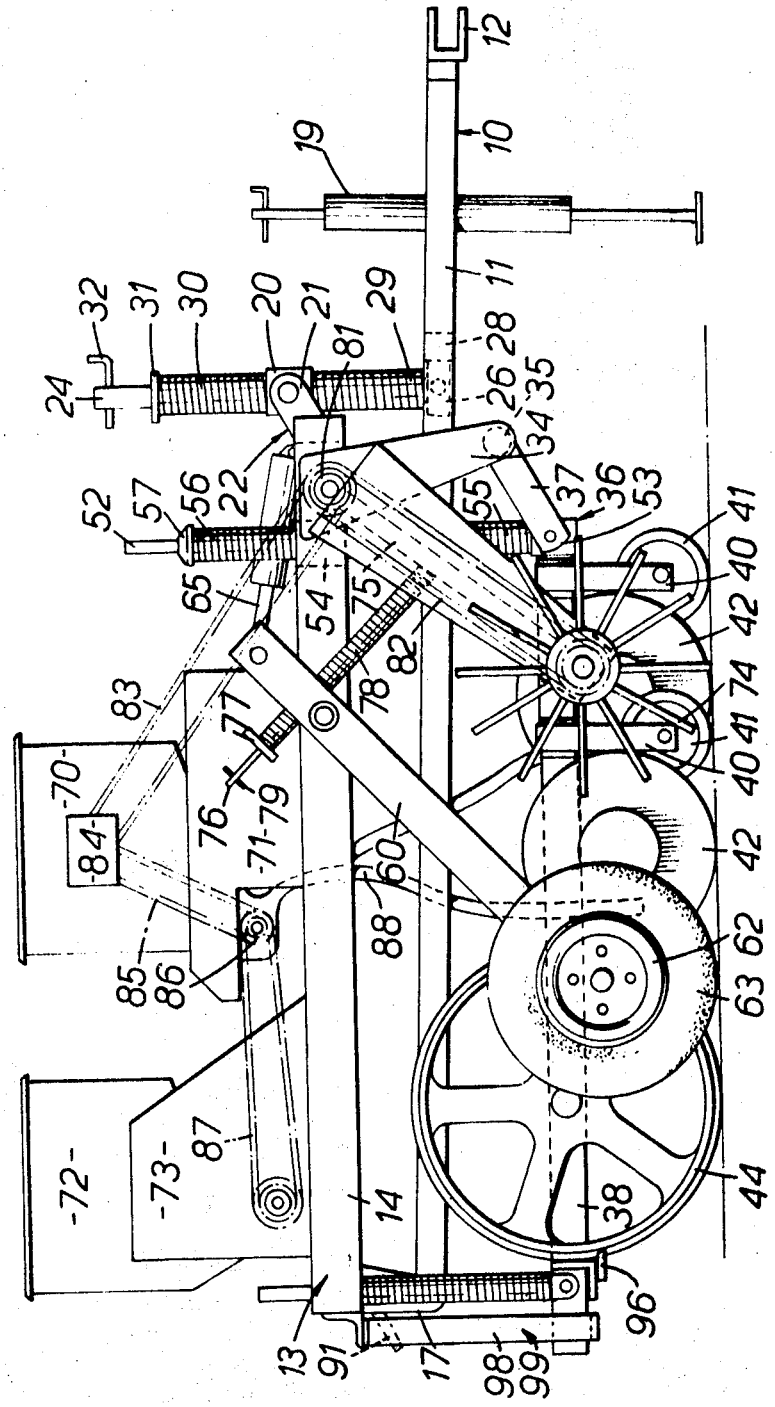
FIG. 2 is an elevation of one side of the apparatus illustrated in FIG. 1 including a side elevation of the seedbox and fertilizer box.

In the embodiments described above, means may be provided for eliminating any tendency for the arm assemblies 36 to move transversely. In one example this is achieved, as illustrated in FIGS 1 and 2, by extending each arm assembly 36 rearwardly and guiding it for vertical movement between substantially parallel limbs 98 of a U-shaped frame 99 secured to the rear end of the rear member 16 of the frame 13. For clarity only two of the guiding means 99 are illustrated.

Single discs may be provided on each or some of the arm assemblies if desired. However, equal numbers of discs should be inclined in each direction so as to balance side forces on the apparatus.

In operation of the apparatus, the drawbar 11 is connected to a towing vehicle, for example an agricultural tractor, and the screwjack 19 is retracted. The tractor hydraulic system is connected to the jack 65 and operated to extend the jack and support the apparatus on the wheels 62. The frame 13 is now lifted so that the depth control rollers 41, disc 42, rollers 44 and spider wheel 74 are clear of the ground in readiness for the apparatus to be towed to a field which is to be sown. The seedbox 70 and fertilizer box 72 are filled.

On arrival at the field and after setting the depth control rollers 41, the tractor hydraulic system is operated to release the pressure fluid from the jack 65 so that the weight of the apparatus acts on the discs 42 to cause them to penetrate the ground. It will be appreciated that the load required on the discs to cause them to penetrate the soil will vary according to the condition of the ground and the apparatus of this invention provides a ready means of adjusting the load on the discs to facilitate efficient use of the apparatus in varying soil conditions. The handle 32 on rod 24 is adjusted as necessary to ensure there is adequate weight on the discs 42 to provide the desired penetration whilst maintaining sufficient weight on the rollers 44 for compaction of the ground after seeding.

The apparatus is towed over the ground and slits are cut and opened by the discs into which seed is deposited from the seedbox 70. The skims 94 ensure that the opened slits are clear for the seed to be dropped in. The rollers close the slits after seeding and fertilizer is dropped onto the ground behind the apparatus as it proceeds.

If an obstruction is encountered by a depth control roller or disc, the arm assembly upon which it mounted lifts due to yield of the spring 55 so that the roller or disc rides over the obstruction without affecting the operation of the remainder of the apparatus which maintains consistent seeding of the other rows being sown.

Under very light soil conditions it may be desirable to support some of the weight of the apparatus on the road wheels 62 to prevent excessive penetration. This may be done by operation of the tractor hydraulic system to extend the jack 65 partially and hold it so extended during seeding.

We claim:

1. In apparatus for preparing and seeding ground including a frame assembly, a seedbox mounted on said frame assembly, a plurality of discs for cutting slits in the ground mounted on said frame assembly for rotation about generally transverse axes, tubes for delivering seeds from said seedbox to said slits and at least one roller mounted on said frame assembly rearwardly of said disc for rotation about a transverse axis being adapted to compact the ground and close slits after seed has been implanted therein, the improvement wherein said frame assembly comprises first and second frames relatively movable in a vertical plane, said first frame comprising a drawbar for connection to a towing vehicle, a plurality of spaced substantially parallel longitudinally extending arm assemblies carrying said disc and mounted on said second frame below said first and second frames, connections between opposite ends of each arm assembly and opposite ends of said second frame, each arm assembly comprising a first arm having a forward end and a rear end, a second arm located rearwardly of said first arm and having a forward end and a rear end, and a pivotal connection connecting together said rear end of said first arm and said forward end of said second arm, resilient means urging said arm assemblies downwardly away from said second frame, an a resilient connection between said second frame and said drawbar by adjustment of which the loading on the apparatus applied to the disc can be varied to control penetration of the discs into the ground and the depth of the slits produced thereby.

2. In apparatus for preparing and seeding ground including a frame assembly, a seedbox mounted on said frame assembly, a plurality of discs for cutting slits in the ground mounted on said frame assembly for rotation about generally transverse axes, tubes for delivering seeds from said seedbox to said slits and at least one roller mounted on said frame assembly rearwardly of said discs for rotation about a transverse axis being adapted to compact the ground and close slits after seed have been implanted therein, the improvement wherein said frame assembly comprises first and second frames relatively movable in a vertical plane, said first frame comprising a drawbar for connection to a towing vehicle, a plurality of spaced substantially parallel longitudinally extending arm assemblies carrying said discs and each having a forward and a rear end, said arm assemblies being mounted on said second frame below said first and second frames, each arm assembly comprising a pair of arms, and a pivotal connection connecting together adjacent ends of said arms, resilient means urging said arm assemblies downwardly away from said second frame, said resilient means comprising a pair of spring loaded struts acting respectively between said second frame and said adjacent ends of said arms of each arm assembly, and between said second frame aNd said rear end of each arm assembly, and a resilient connection between said second frame and said drawbar by adjustment of which the loading on the apparatus applied to the discs can be varied to control penetration of the discs into the ground and the depth of the slits produced thereby.

3. Apparatus as claimed in claim 1, wherein each first arm carries a pair of discs and each second arm carries a pair of ground-compacting rollers.

4. Apparatus as claimed in claim 1, wherein each second arm carries a pair of discs and a pair of ground-compacting rollers, and said discs are located adjacent to forward end of said second arm and said rollers are located adjacent to said rear end of said second arm.

5. Apparatus as claimed in claim 1, wherein each arm assembly carries a pair of discs and a pair of ground-compacting rollers, said discs on adjacent arm assemblies being staggered longitudinally with respect to each other so that discs on alternate arm assemblies are aligned transversely.